(12) United States Patent  (10) Patent No.: US 10,275,148 B2
Matas et al.  (45) Date of Patent: Apr. 30, 2019

(54) METHODS AND SYSTEMS FOR TRANSITIONING BETWEEN NATIVE CONTENT AND WEB CONTENT

(71) Applicant: Facebook, Inc., Menlo Park, CA (US)

(72) Inventors: Michael James Matas, Healdsburg, CA (US); Benjamin S. Langholz, San Francisco, CA (US); Brian Daniel Amerige, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 647 days.

(21) Appl. No.: 14/692,515

(22) Filed: Apr. 21, 2015

(65) Prior Publication Data

US 2016/0313908 A1  Oct. 27, 2016

(51) Int. Cl.
  *G06F 3/0488* (2013.01)
  *G06F 3/0485* (2013.01)
  *G06F 3/0483* (2013.01)

(52) U.S. Cl.
  CPC ........ *G06F 3/04883* (2013.01); *G06F 3/0483* (2013.01); *G06F 3/0485* (2013.01); *G06F 3/04886* (2013.01); *G06F 2203/04803* (2013.01)

(58) Field of Classification Search
  CPC .. G06F 3/0483; G06F 3/0485; G06F 3/04883; G06F 2203/04803; G06F 3/04886
  See application file for complete search history.

(56) References Cited

U.S. PATENT DOCUMENTS

| | | | |
|---|---|---|---|
| 9,081,421 B1* | 7/2015 | Lai | G06F 3/017 |
| 9,285,977 B1* | 3/2016 | Greenberg | G06F 3/0485 |
| 2004/0021673 A1* | 2/2004 | Alessi | G06F 3/0481 |
| | | | 345/619 |
| 2009/0141046 A1* | 6/2009 | Rathnam | G06F 3/03547 |
| | | | 345/661 |
| 2011/0283236 A1* | 11/2011 | Beaumier | G07F 11/002 |
| | | | 715/835 |
| 2011/0296351 A1* | 12/2011 | Ewing, Jr. | G06F 3/0346 |
| | | | 715/841 |
| 2013/0120254 A1* | 5/2013 | Mun | G06F 3/017 |
| | | | 345/158 |
| 2013/0198682 A1* | 8/2013 | Matas | G06T 11/60 |
| | | | 715/784 |
| 2013/0283154 A1* | 10/2013 | Sasakura | G06F 17/217 |
| | | | 715/253 |

(Continued)

*Primary Examiner* — Andrea N Long
(74) *Attorney, Agent, or Firm* — Morgan, Lewis & Bockius LLP

(57) ABSTRACT

In an electronic device, a cover page of a first content item is displayed and a first swipe gesture in a first direction is detected. In response to detecting the first swipe gesture, the electronic device transitions from displaying the cover page to displaying the first content item. During the transition, a portion of the cover page and a portion of the first content item are simultaneously displayed. After the transitioning, the first content item is displayed, and a second swipe gesture is detected in a second direction substantially opposite to the first direction. In response to detecting the second swipe gesture, the electronic device transitions from displaying the first content item to displaying the cover page, during which the portion of the first content item and the portion of the cover page are simultaneously displayed.

19 Claims, 17 Drawing Sheets

(56) References Cited

U.S. PATENT DOCUMENTS

| | | | |
|---|---|---|---|
| 2014/0068430 A1* | 3/2014 | Wu | G06F 17/212 |
| | | | 715/277 |
| 2014/0380247 A1* | 12/2014 | Tecarro | G06F 3/0483 |
| | | | 715/863 |
| 2015/0033104 A1* | 1/2015 | Zhang | G06F 17/30873 |
| | | | 715/205 |
| 2015/0169516 A1* | 6/2015 | Martin | G06F 17/2288 |
| | | | 715/201 |

* cited by examiner

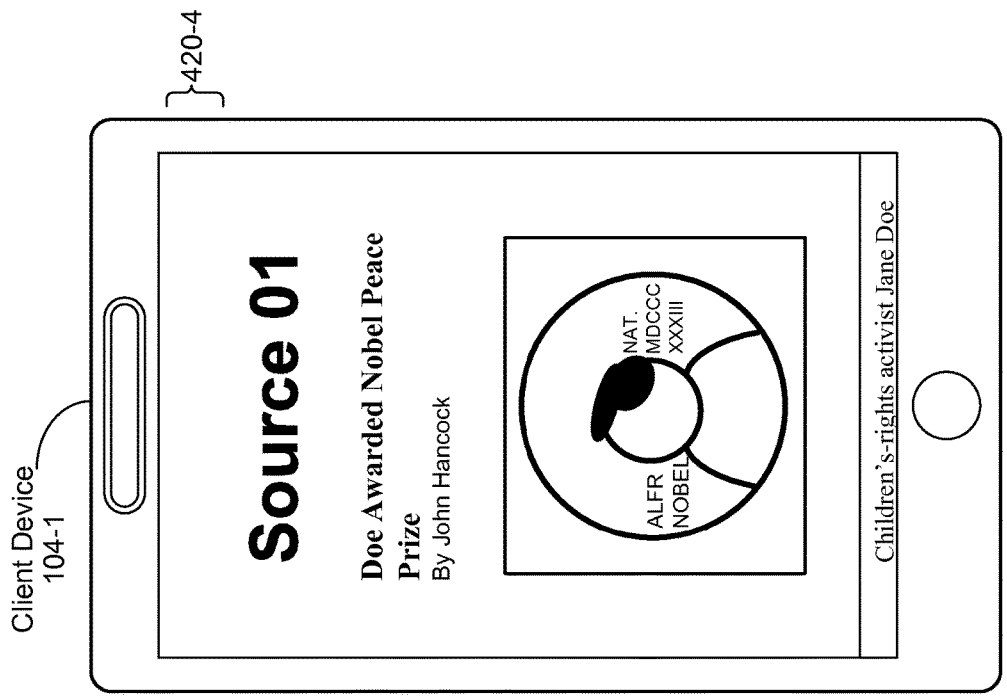
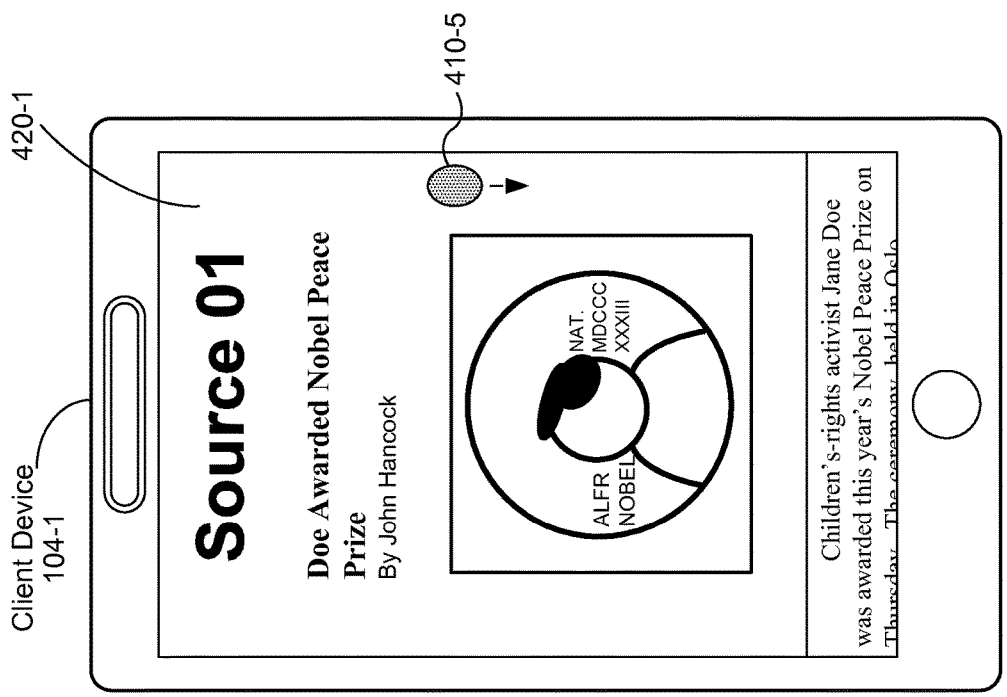
FIGURE 4L
FIGURE 4K

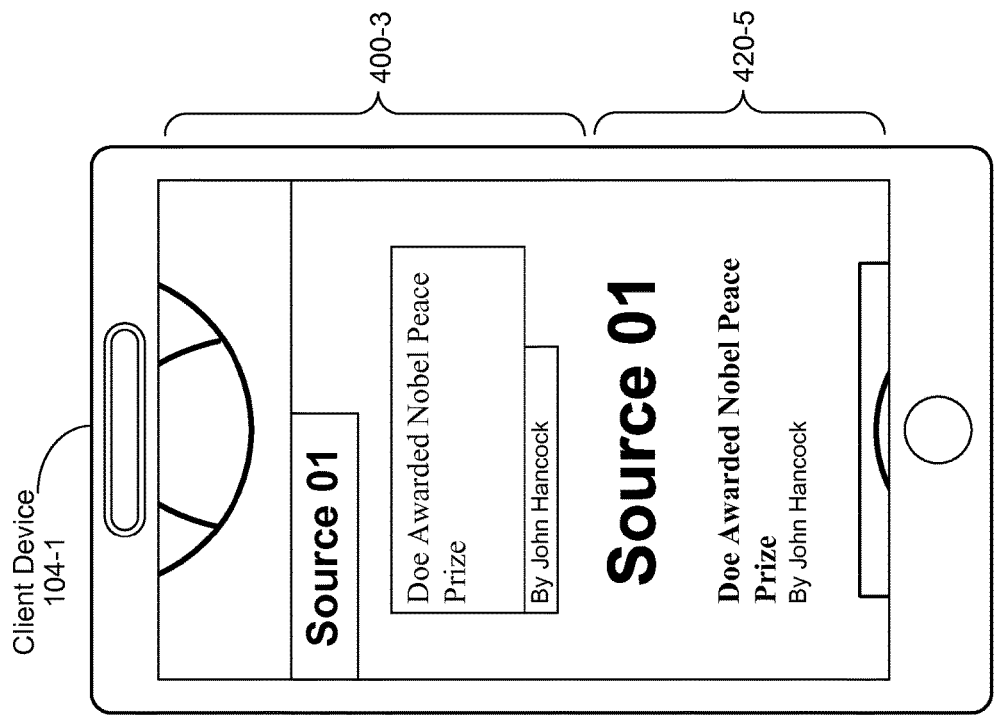
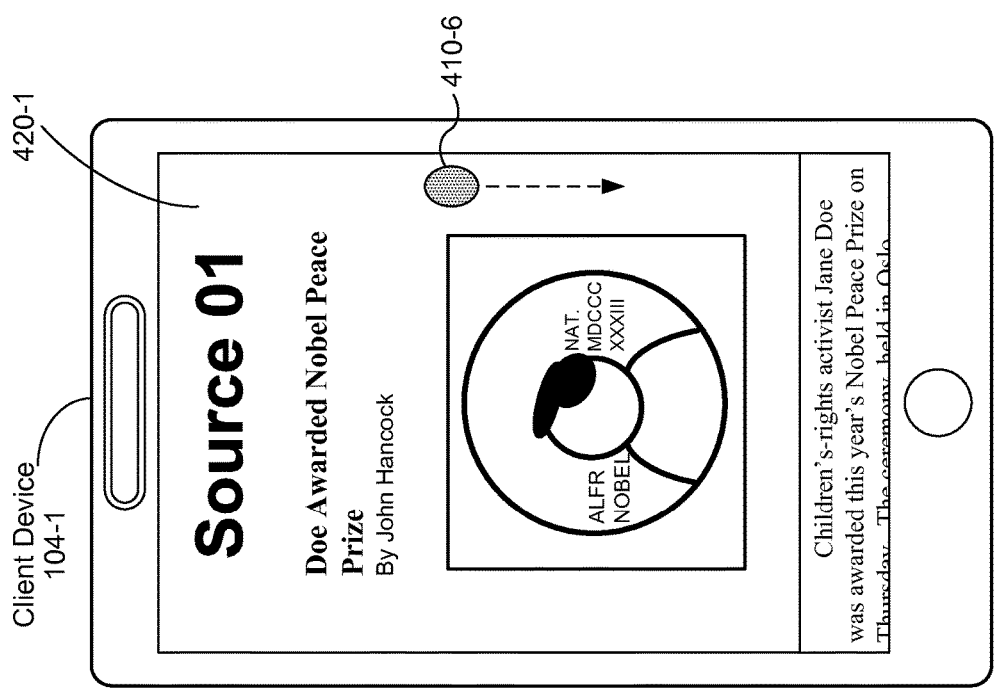
FIGURE 4N
FIGURE 4M

METHODS AND SYSTEMS FOR TRANSITIONING BETWEEN NATIVE CONTENT AND WEB CONTENT

TECHNICAL FIELD

This relates generally to viewing native content and web content, including but not limited to using swipe gestures to navigate and view web content.

BACKGROUND

The Internet has become an increasingly dominant platform for the publication of electronic content, for both the media and the general population.

Given the abundance of electronic content published through such channels, consumers often struggle to view and navigate electronic content in an efficient manner.

SUMMARY

Accordingly, there is a need for methods, systems, and interfaces for viewing and navigating web content in a simple and efficient manner. By utilizing cover pages of content items, and swipe gestures to view, download, and/or navigate between content items and their cover pages, users can efficiently and easily digest electronic content. For example, rather than executing a separate application (e.g., generic web browser for viewing web content) to view a content item, the content item can be viewed within the same application (e.g., a native application for viewing native content). Furthermore, content items can be viewed within the same window of the application, rather than switching to a different window of an integrated browser of the application. Such methods and interfaces optionally complement or replace conventional methods for viewing web content.

In accordance with some embodiments, a method is performed at an electronic device (e.g., a client device) with one or more processors and memory storing instructions for execution by the one or more processors. The method includes displaying a cover page of a first content item and detecting a first swipe gesture in a first direction. In response to detecting the first swipe gesture, the method includes transitioning from display of the cover page of the first content item to display of the first content item. During the transition, a first portion of the cover page of the first content item and a first portion of the first content item are simultaneously displayed. After the transitioning, the first content item is displayed. While displaying the first content item, a second swipe gesture is detected in a second direction substantially opposite to the first direction. In response to detecting the second swipe gesture, the method includes transitioning from display of the first content item to display of the cover page of the first content item, during which the first portion of the first content item and the first portion of the cover page of the first content item are simultaneously displayed.

In accordance with some embodiments, an electronic device (e.g., a client device) includes one or more processors, memory, and one or more programs; the one or more programs are stored in the memory and configured to be executed by the one or more processors. The one or more programs include instructions for performing the operations of the method described above. In accordance with some embodiments, a non-transitory computer-readable storage medium has stored therein instructions that, when executed by the electronic device, cause the electronic device to perform the operations of the method described above.

Thus, electronic devices are provided with more effective and efficient methods for viewing web content, thereby increasing the effectiveness and efficiency of such devices and user satisfaction with such devices.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first content item could be termed a second content item, and, similarly, a second content item could be termed a first content item, without departing from the scope of the various described embodiments. The first content item and the second content item are both content items, but they are not the same content item.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind"

Figure 1:
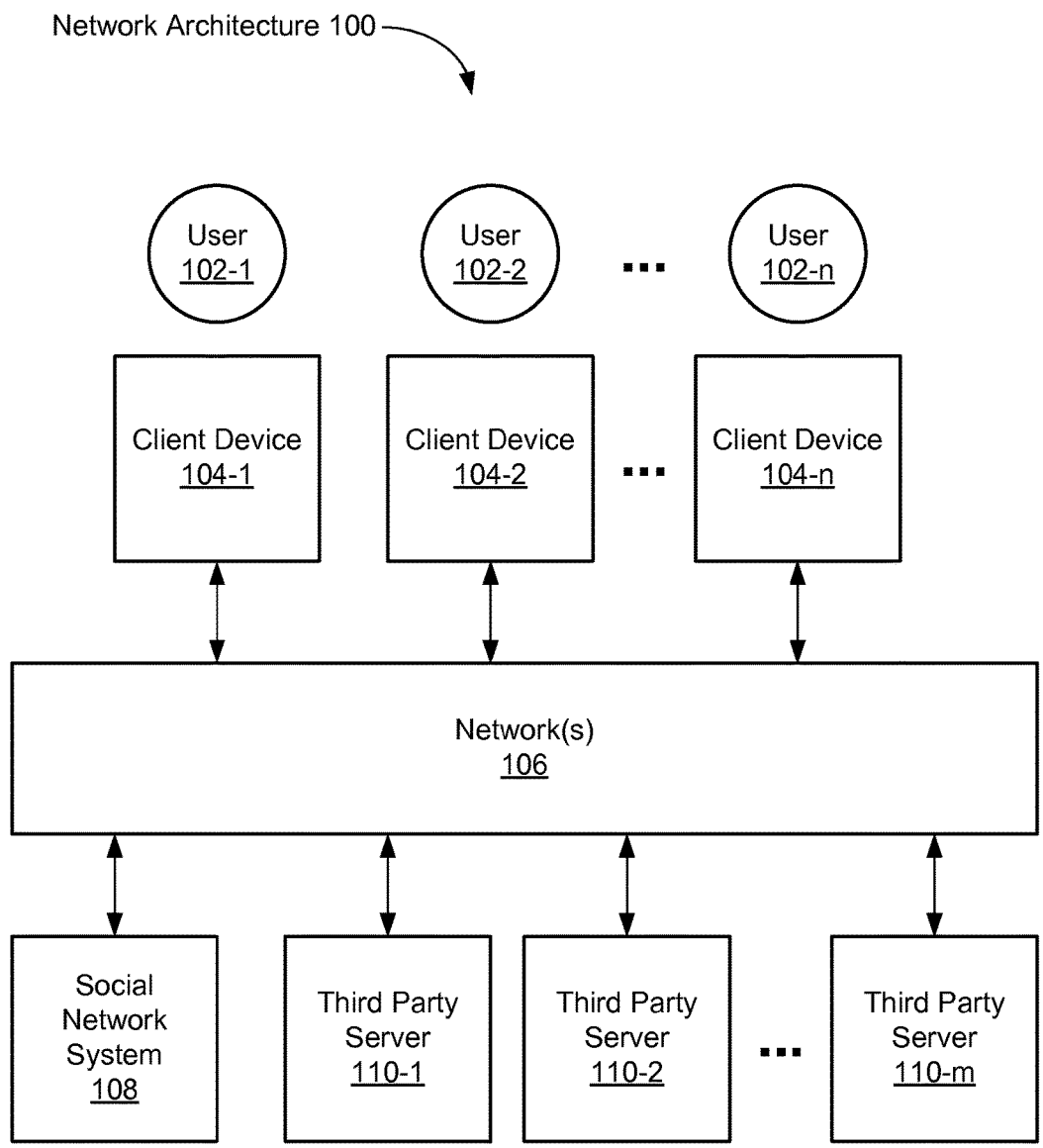
FIG. 1 is a block diagram illustrating an exemplary network architecture of a social network in accordance with some embodiments.

FIG. 1 is a block diagram illustrating an exemplary network architecture 100 of a social network in accordance with some embodiments. The network architecture 100 includes a number of client devices (also called "client systems," "client computers," or "clients") 104-1, 104-2, . . . 104-$n$ communicably connected to an electronic social-network system 108 by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, . . . 104-$n$ are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social-network system 108. In some embodiments, the social-network system 108 is a single computing device such as a computer server, while in other embodiments, the social-network system 108 is implemented by multiple computing devices working together to perform the actions of a server system (e.g., cloud computing).

Users 102-1, 102-2, . . . 102-$n$ employ the client devices 104-1, 104-2, . . . 104-$n$ to access the social-network system 108 and to participate in a corresponding social-networking service provided by the social-network system 108. For example, one or more of the client devices 104-1, 104-2, . . . 104-$n$ execute web browser applications that can be used to access the social-networking service. As another example, one or more of the client devices 104-1, 104-2, . . . 104-$n$ execute software applications that are specific to the social-networking service (e.g., social-networking "apps" running on smart phones or tablets, such as a Facebook social-networking application running on an iPhone, Android, or Windows smart phone or tablet).

Users interacting with the client devices 104-1, 104-2, . . . 104-$n$ can participate in the social-networking service provided by the social-network system 108 by posting information, such as text comments (e.g., updates, announcements, replies), digital photos, videos, audio files, links, and/or other electronic content. Users of the social-networking service can also annotate information posted by other users of the social-networking service (e.g., endorsing or "liking" a posting of another user, or commenting on a posting by another user). In some embodiments, information can be posted on a user's behalf by systems and/or services external to the social-network system 108. For example, the user may post a review of a movie to a movie-review website, and with proper permissions that website may cross-post the review to the social network system 108 on the user's behalf. In another example, a software application executing on a mobile client device, with proper permissions, may use global positioning system (GPS) or other geo-location capabilities (e.g., Wi-Fi or hybrid positioning systems) to determine the user's location and update the social network system 108 with the user's location (e.g., "At Home", "At Work", or "In San Francisco, Calif."), and/or update the social network system 108 with information derived from and/or based on the user's location. Users interacting with the client devices 104-1, 104-2, . . . 104-$n$ can also use the social-networking service provided by the social-network system 108 to define groups of users, to communicate with each other, and to collaborate with each other.

In some embodiments, the network architecture 100 also includes third-party servers 110-1, 110-2, . . . 110-$m$. In some embodiments, a given third-party server 110 is used to host third-party websites that provide web pages to client devices 104, either directly or in conjunction with the social-network system 108. In some embodiments, the social-network system 108 uses inline frames ("iframes") to nest independent websites within a user's social network session. In some embodiments, a given third-party server is used to host third-party applications that are used by client devices 104, either directly or in conjunction with the social-network system 108. In some embodiments, the social-network system 108 uses iframes to enable third-party developers to create applications that are hosted separately by a third-party server 110, but operate within a social-networking session of a user 102 and are accessed through the user's profile in the social-network system 108. Exemplary third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the social-network system 108. In some embodiments, a given third-party server 110 is used to provide third-party content (e.g., news articles, reviews, message feeds, other web content, etc.).

In some embodiments, a given third-party server 110 is a single computing device, while in other embodiments, a given third-party server 110 is implemented by multiple computing devices working together to perform the actions of a server system (e.g., cloud computing).

Figure 2:
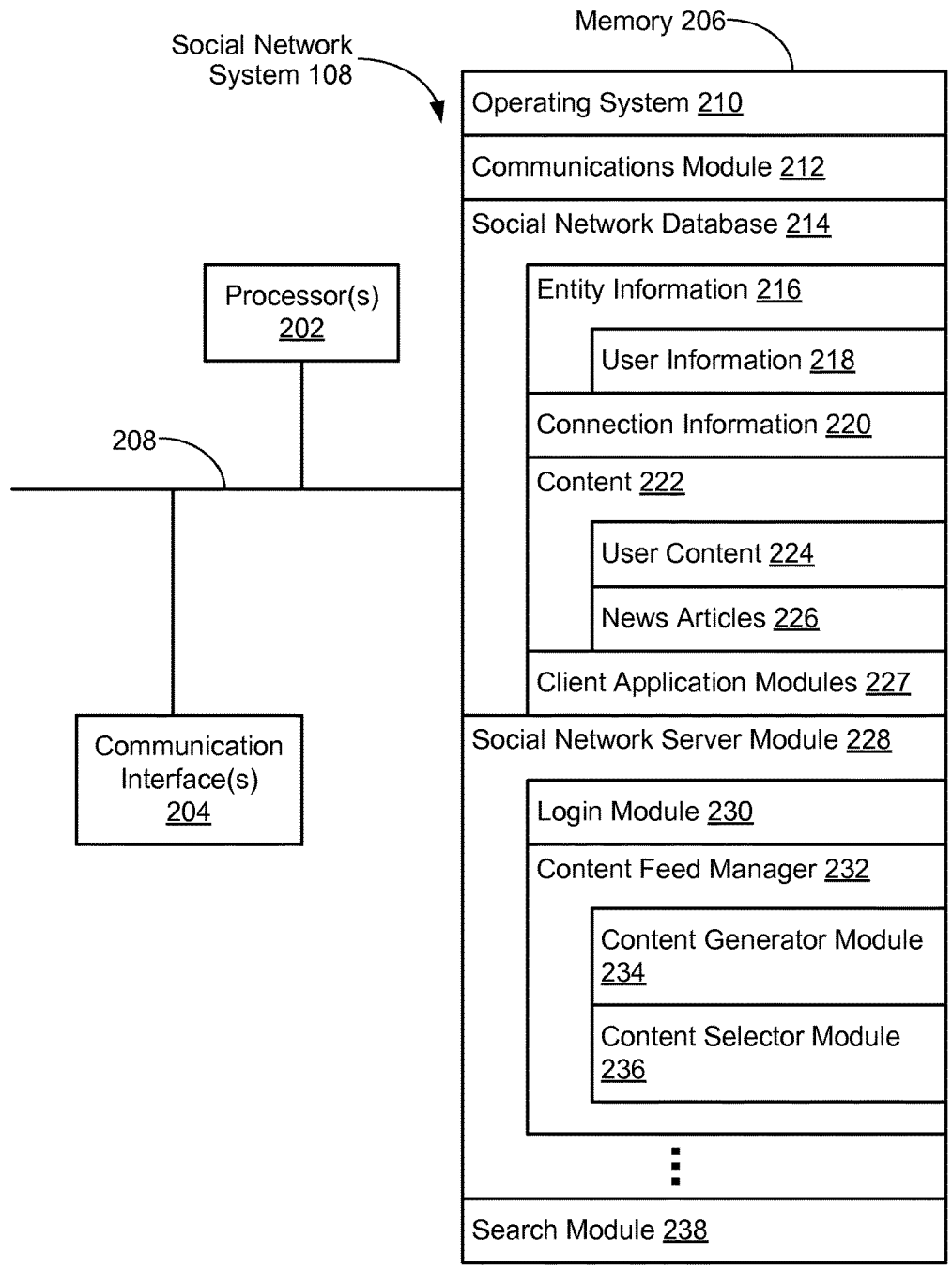
FIG. 2 is a block diagram illustrating an exemplary social-network system in accordance with some embodiments.

FIG. 2 is a block diagram illustrating an exemplary social-network system 108 in accordance with some embodiments. The social-network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The social-network system 108 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 3:
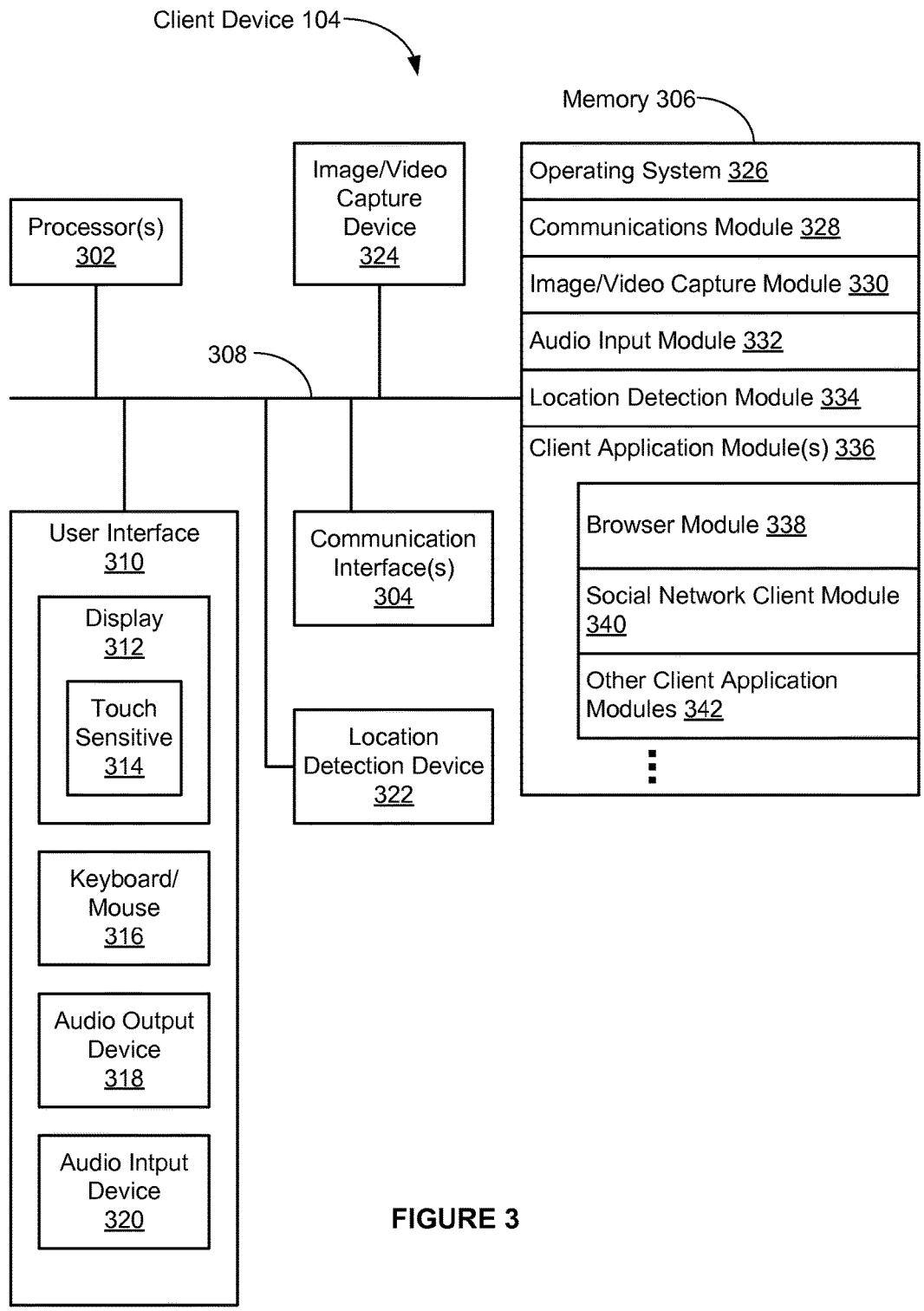
FIG. 3 is a block diagram illustrating an exemplary client device in accordance with some embodiments.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 210 that includes procedures for handling various basic system services and for performing hardware dependent tasks;
- a network communication module 212 that is used for connecting the social-network system 108 to other computers via the one or more communication network interfaces 204 (wired or wireless) and one or more communication networks (e.g., the one or more networks 106);
- a social network database 214 for storing data associated with the social network, such as:
  entity information 216, such as user information 218;
  connection information 220; and
  content 222, such as user content 224, news articles 226, and/or other native content (e.g., content that has been converted from a web-content format that is browser-compatible to a format that is native to the social-network system 108);
- client application modules 227 (e.g., one or more client application modules 336, FIG. 3) that may be downloaded and executed by a client device 104;
- a social network server module 228 for providing social-networking services and related features (e.g., in conjunction with browser module 338 or social network client module 340 on the client device 104, FIG. 3), which includes:
  a login module 230 for logging a user 102 at a client 104 into the social-network system 108; and
  a content feed manager 232 for providing content to be sent to clients 104 for display, which includes:
    a content generator module 234 for adding objects to the social network database 214, such as images, videos, audio files, comments, status messages, links, applications, and/or other entity information 216, connection information 220, or content 222; and
    a content selector module 236 for choosing the information/content to be sent to clients 104 for display; and
- a search module 238 for enabling users of the social-network system to search for content and other users in the social network.

The social network database 214 stores data associated with the social network in one or more types of databases, such as graph, dimensional, flat, hierarchical, network, object-oriented, relational, and/or XML databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social-networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social-network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social-network system 108 transmits a "friend request" to the second user. If the second user confirms the "friend request," the social-network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social-networking service that corresponds to the entity at the other node may include, for example, a selectable "like," "check in," or "add to favorites" icon. After the user clicks one of these icons, the social-network system 108 may create a "like" edge, "check in" edge, or a "favorites" edge in response to the corresponding user action. As another example, the user may listen to a particular song using a particular application (e.g., an online music application). In this case, the social-network system 108 may create a "listened" edge and a "used" edge between the user node that corresponds to the user and the entity nodes that correspond to the song and the application, respectively, to indicate that the user listened to the song and used the application. In addition, the social-network system 108 may create a "played" edge between the entity nodes that correspond to the song and the application to indicate that the particular song was played by the particular application.

In some embodiments, content 222 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

FIG. 3 is a block diagram illustrating an exemplary client device 104 in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In some embodiments, the touch-sensitive surface 314 is configured to detect various swipe gestures (e.g., in vertical and/or horizontal directions) and/or other gestures (e.g., single/double tap). In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

Figure 4B:
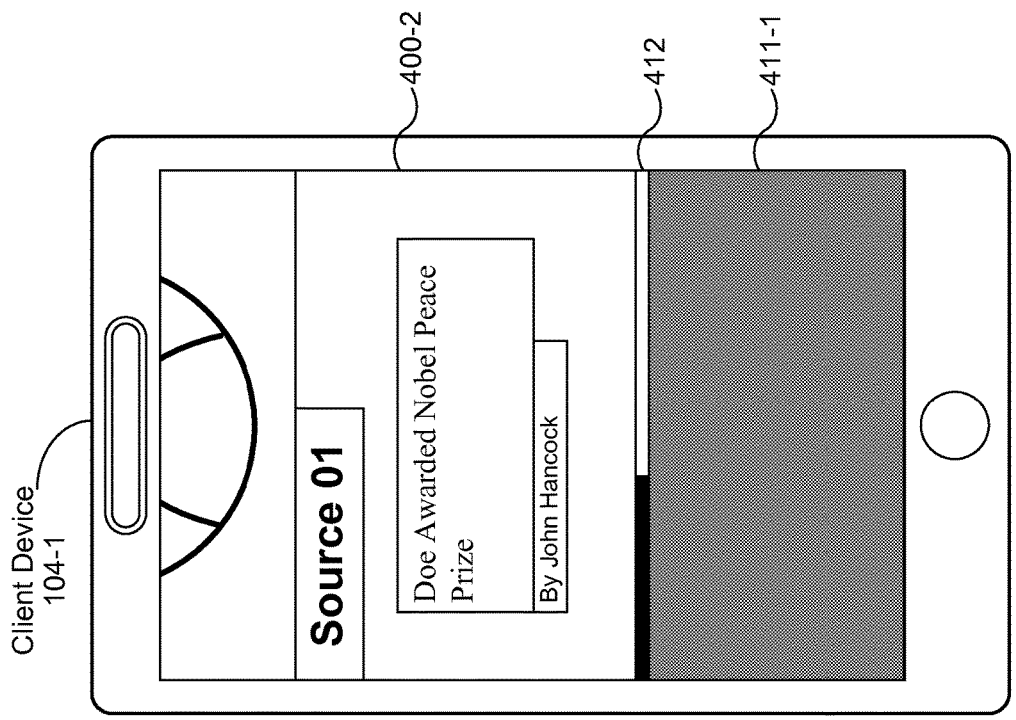
FIGS. 4A-4R illustrate exemplary graphical user interfaces (GUIs) on a client device for viewing content items, in accordance with some embodiments.
Figure 4A:
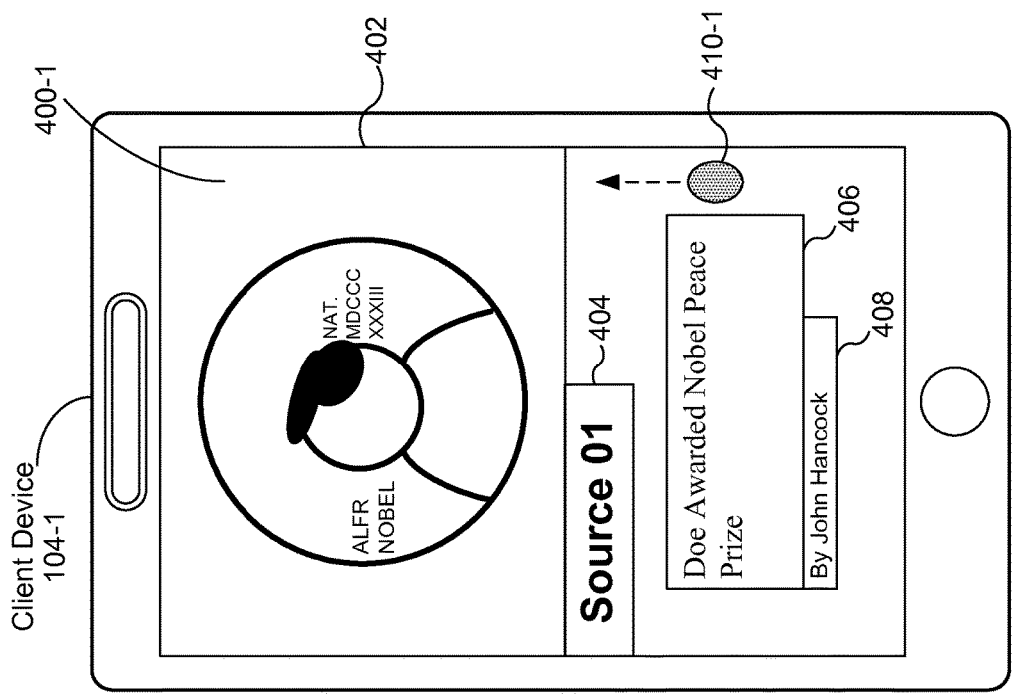
Figure 4D:
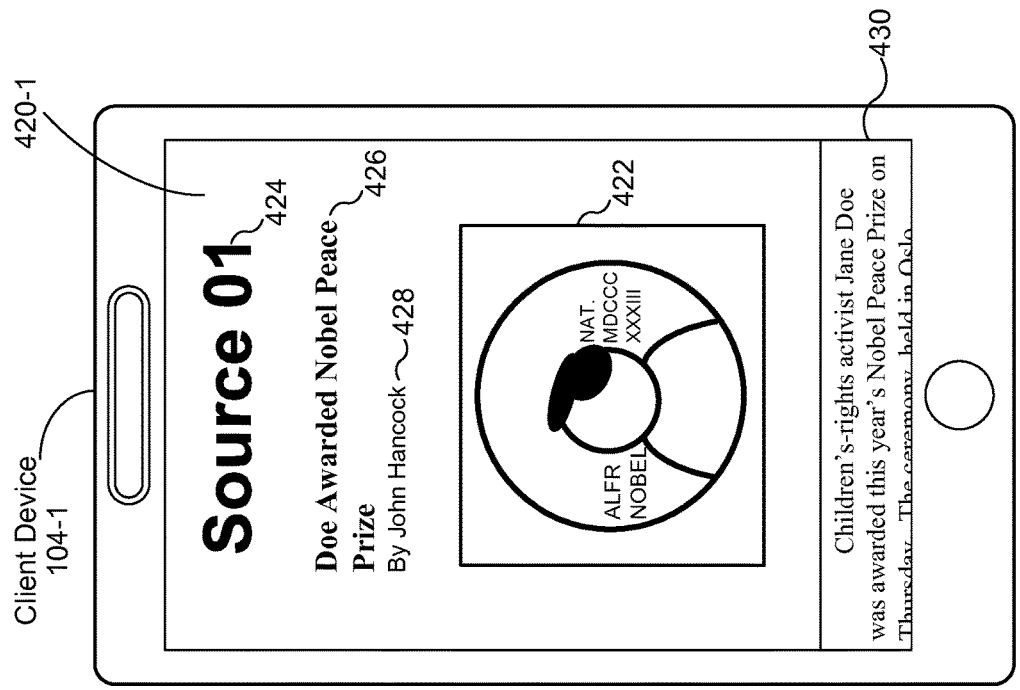
Figure 4C:
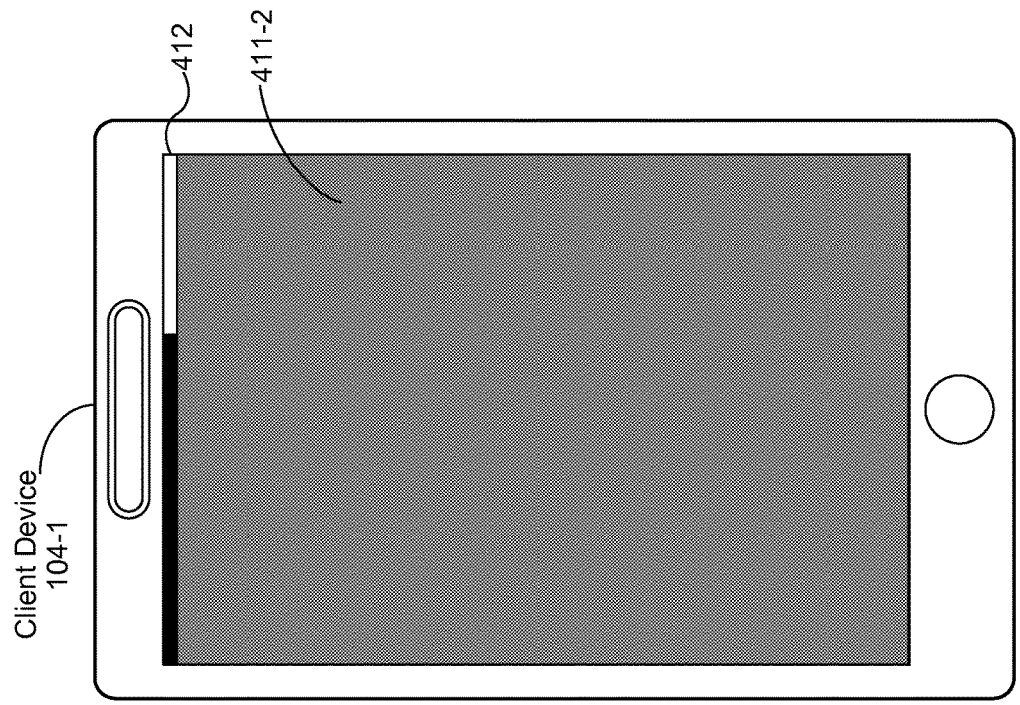
Figure 4E:
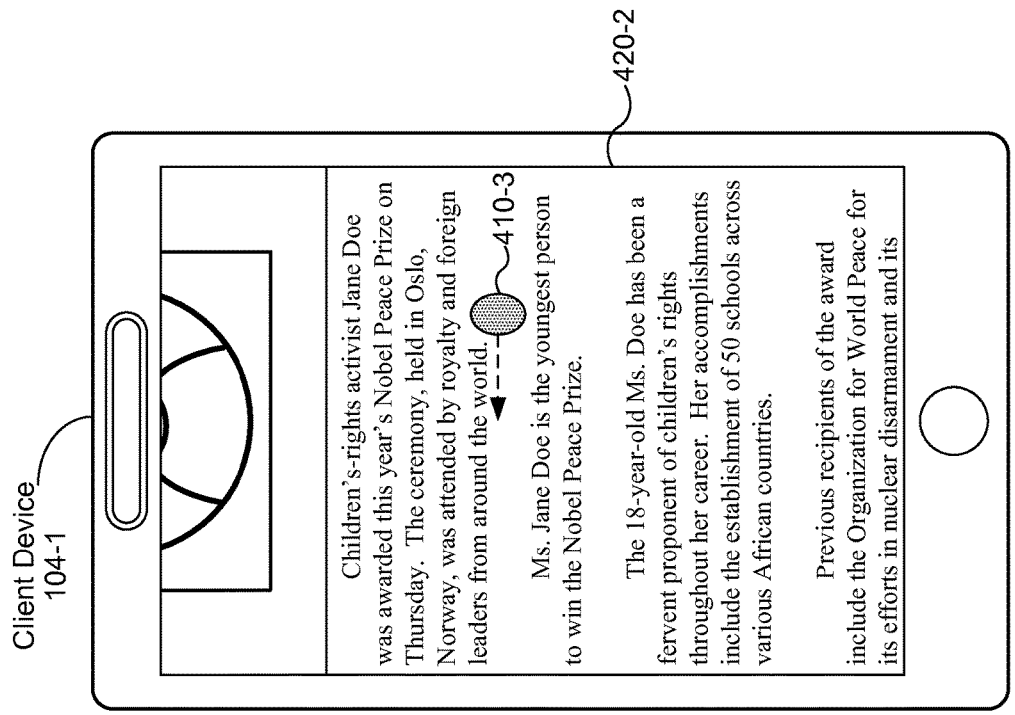
Figure 4F:
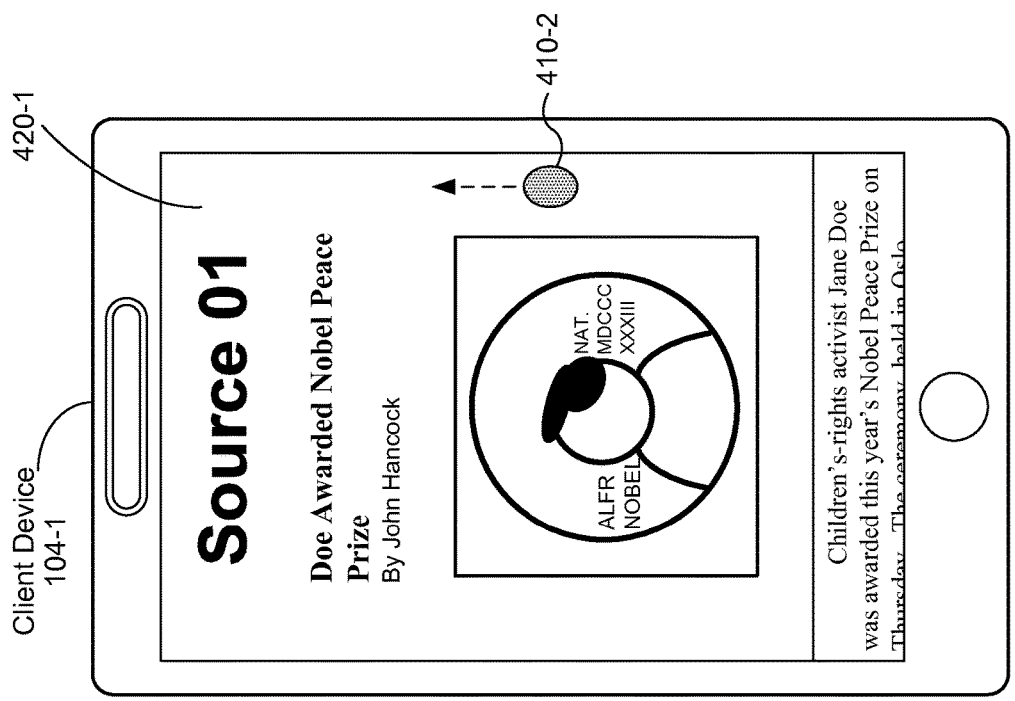
Figure 4H:
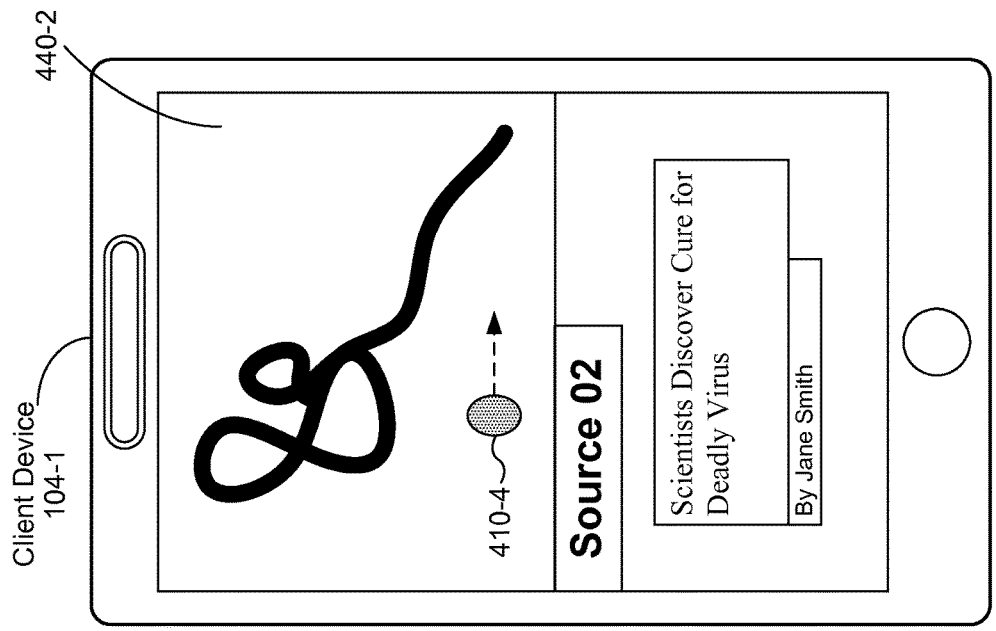
Figure 4G:
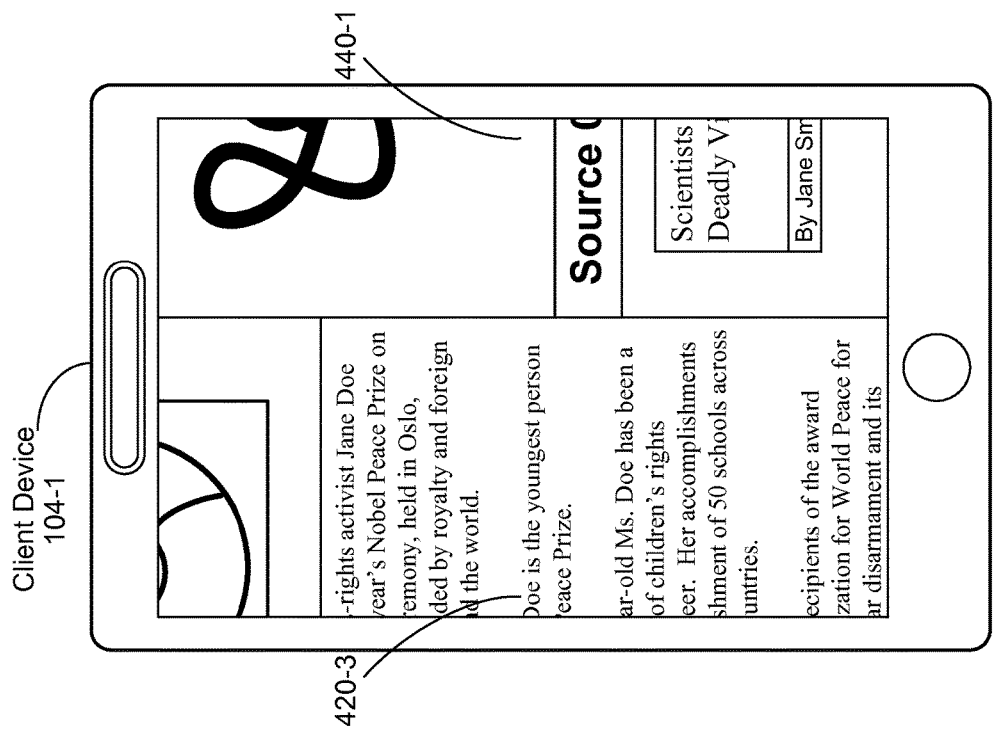
Figure 4J:
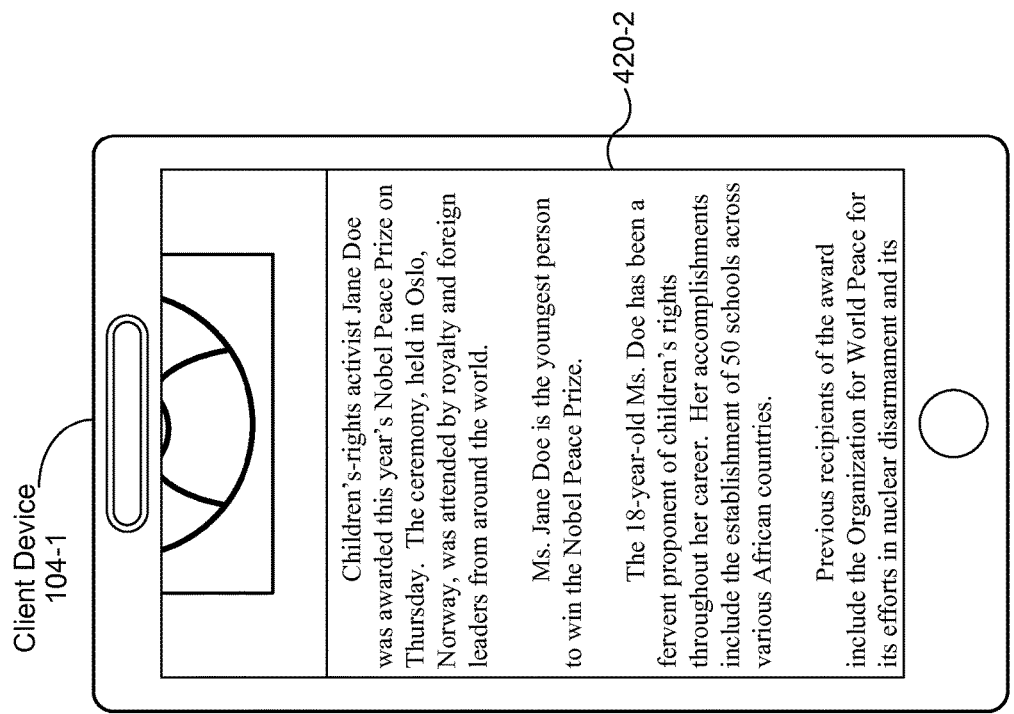
Figure 4I:
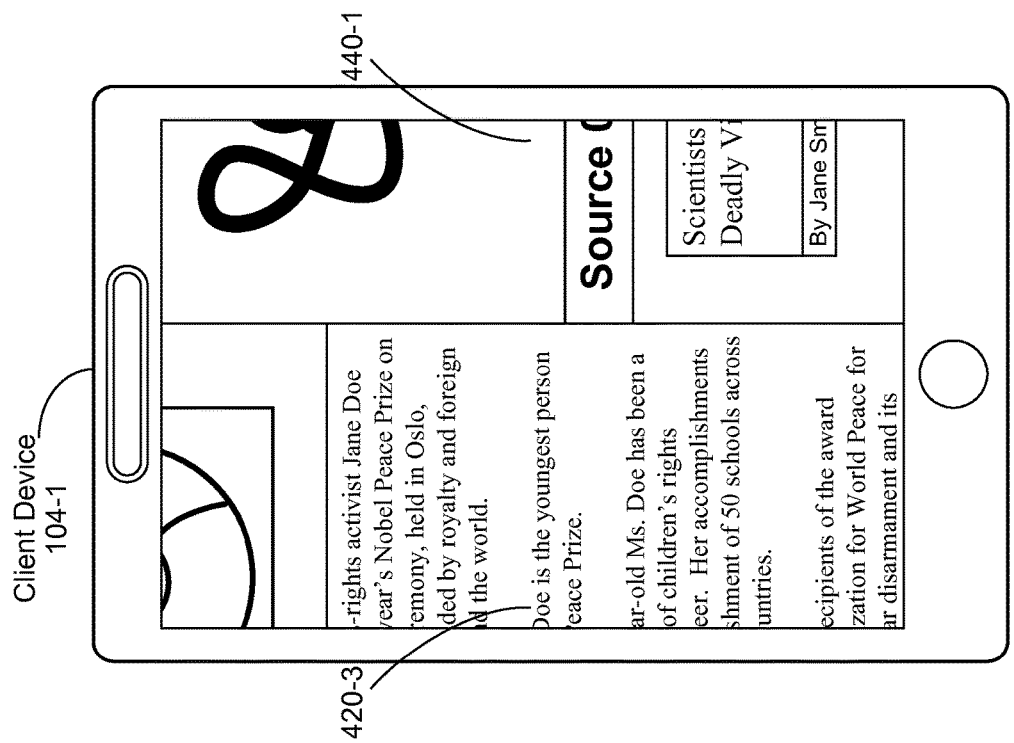
Figure 4O:
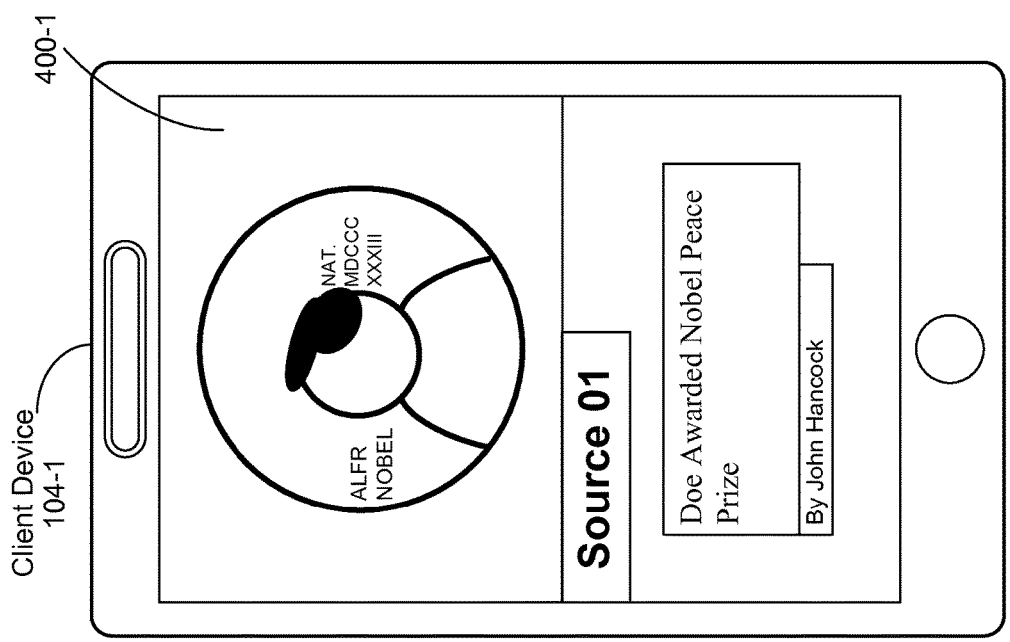
Figure 4Q:
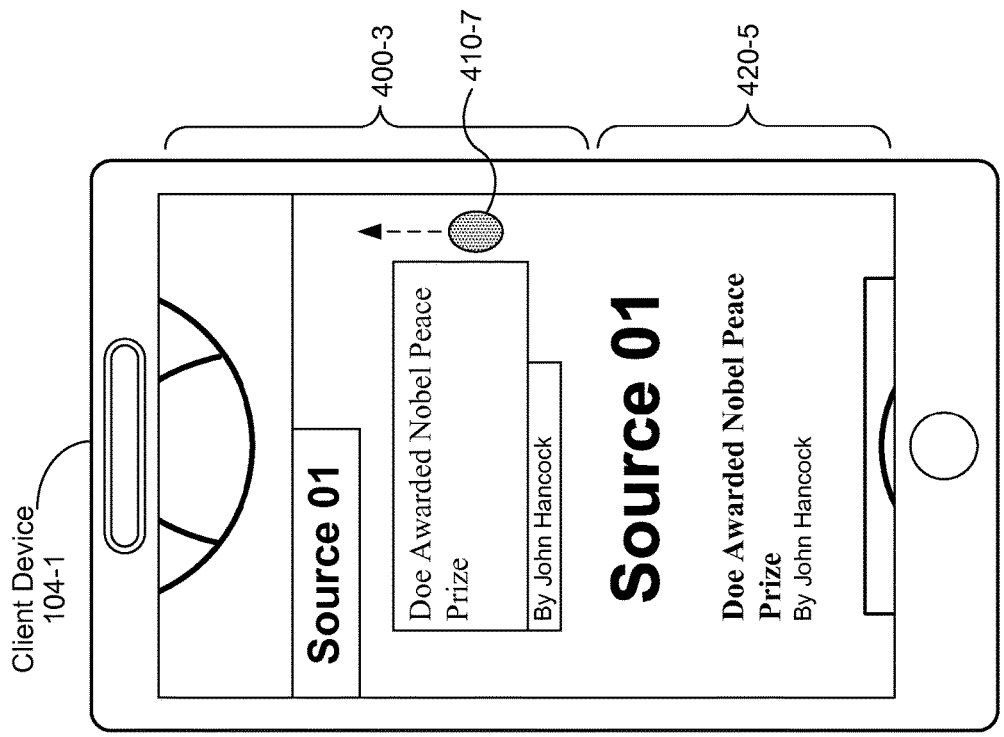
Figure 4P:
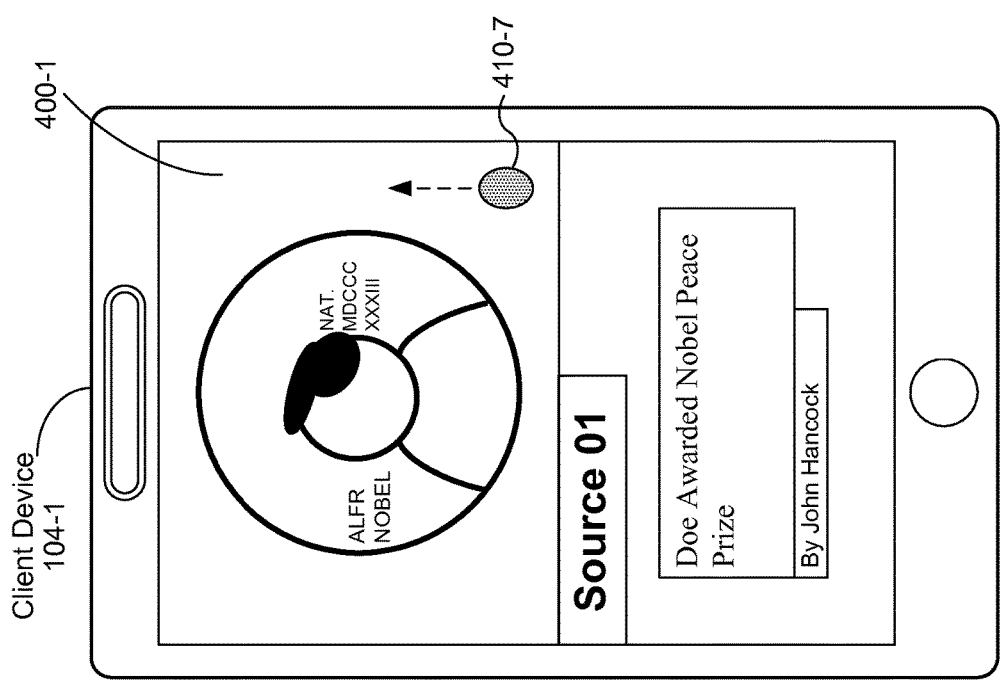
Figure 4R:
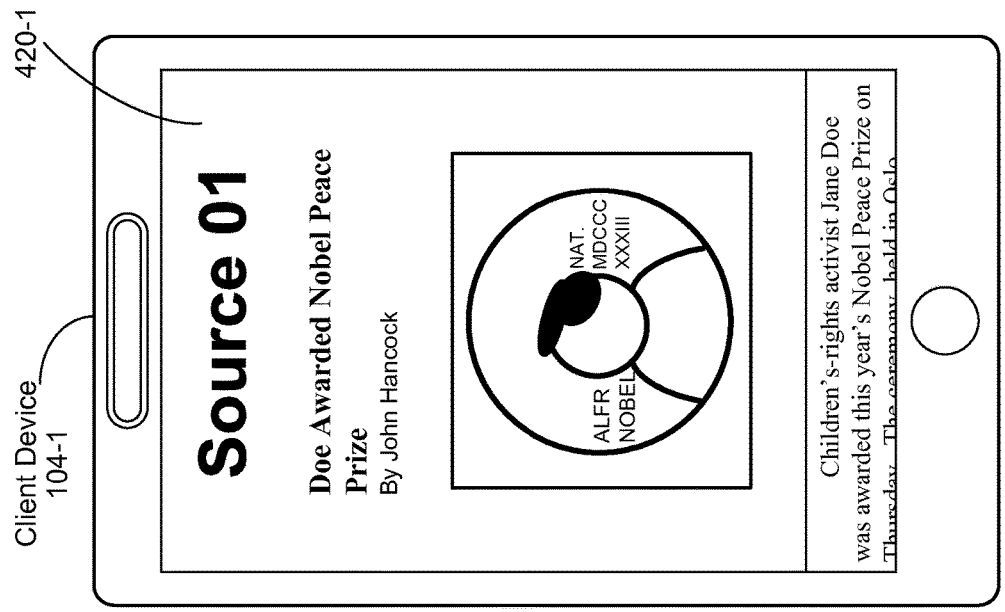

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;
- an image/video capture module 330 (e.g., a camera module) for processing a respective image or video captured by the image/video capture device 324, where the respective image or video may be sent or streamed (e.g., by a client application module 336) to the social-network system 108;
- an audio input module 332 (e.g., a microphone module) for processing audio captured by the audio input device 320, where the respective audio may be sent or streamed (e.g., by a client application module 336) to the social-network system 108;
- a location detection module 334 (e.g., a GPS, Wi-Fi, or hybrid positioning module) for determining the location of the client device 104 (e.g., using the location detection device 322) and providing this location information for use in various applications (e.g., social network client module 340); and
- one or more client application modules 336, including the following modules (or sets of instructions), or a subset or superset thereof:
  - a web browser module 338 (e.g., Internet Explorer by Microsoft, Firefox by Mozilla, Safari by Apple, or Chrome by Google) for accessing, viewing, and interacting with web sites (e.g., a social-networking web site provided by the social-network system 108 and/or web sites that are linked to a social network module 340 and/or an optional client application module 342), such as a web site hosting a service for displaying and accessing content items (e.g., content items, such as news articles and other web content, shown in FIGS. 4A-4R)
  - a social network module 340 for providing an interface to a social-networking service (e.g., a social-networking service provided by social-network system 108) and related features, such as an interface to a service for displaying and accessing content items (e.g., content items, such as news articles and other web content, and cover pages of content items, such as native content, shown in FIGS. 4A-4R); and/or optional client application modules 342, such as applications for displaying and accessing content items (e.g., content items, such as news articles and web content, and cover pages of content items, such as native content, shown in FIGS. 4A-4R), word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards embodiments of graphical user interfaces ("GUIs") and associated processes that may be implemented on a client device (e.g., the client device 104 in FIG. 3).

Figure 5A:
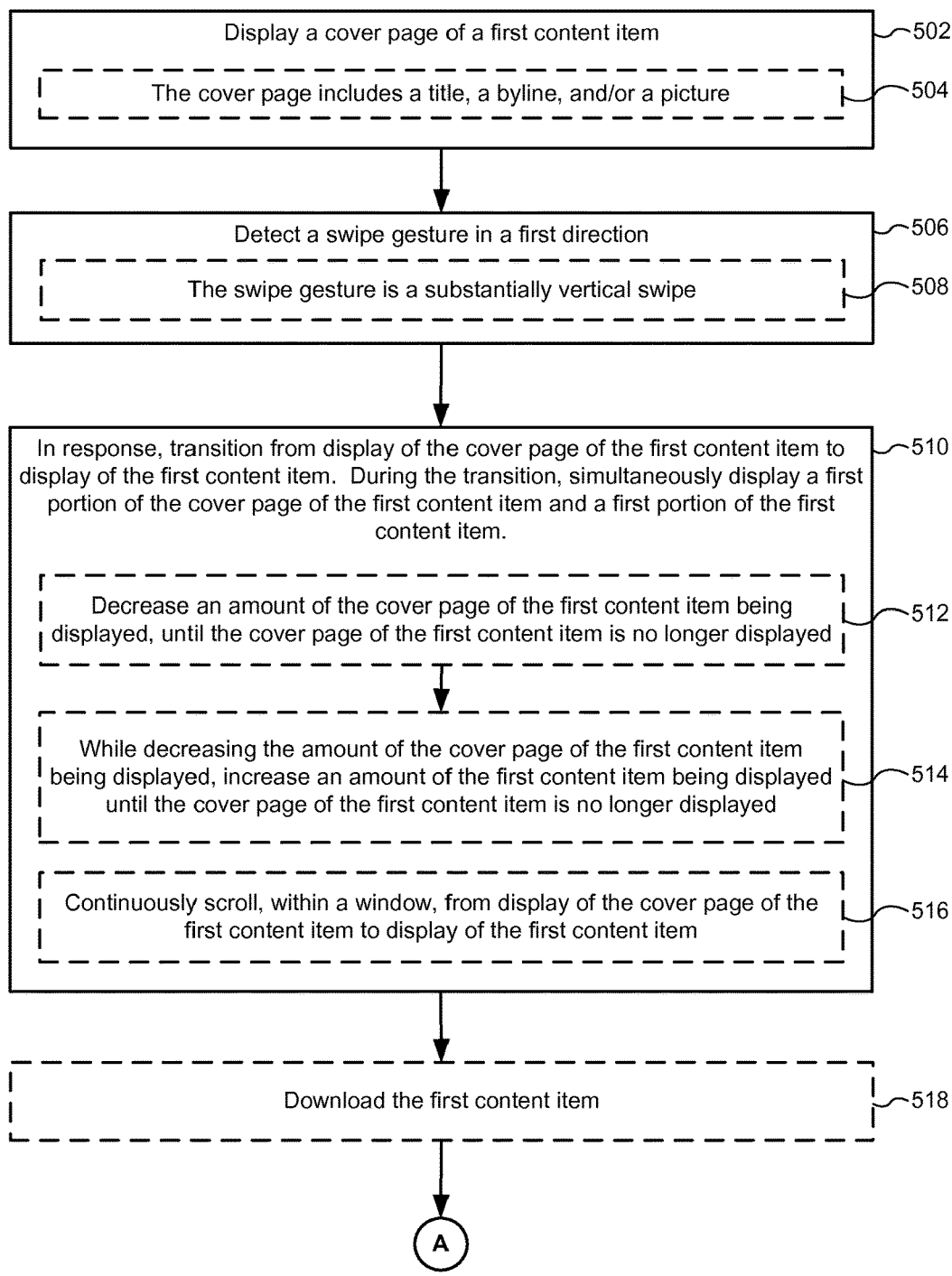
FIGS. 5A-5D are flow diagrams illustrating methods for viewing content items, in accordance with some embodiments.

FIGS. 4A-4R illustrate exemplary GUIs on a client device 104 for viewing content items, in accordance with some embodiments. The GUIs in these figures are used to illustrate the processes described below, including the methods 500 (FIGS. 5A-5C) and 550 (FIG. 5D). While FIGS. 4A-4R illustrate examples of GUIs, in other embodiments, a GUI displays user-interface elements in arrangements distinct from the embodiments of FIGS. 4A-4R.

FIGS. 4A-4R illustrate examples of GUIs for viewing content items, such as news articles. The GUIs may be provided by a web browser (e.g., web browser module 338, FIG. 3), an application for a social-networking service (e.g., social network module 340), and/or a third-party application (e.g., client application module 342).

FIG. 4A illustrates a GUI for a cover page 400-1 of a content item. FIGS. 4B-4R illustrate various GUIs displayed in response to detected gestures, starting from the cover page 400-1. For example, swipe gesture 410-1 in FIG. 4A and swipe gesture 410-7 in FIG. 4P result in switching from displaying the cover page 400-1 to displaying the corresponding content item, while swipe gesture 410-3 in FIG. 4F results in a transition from displaying the content item to displaying the cover page 440-2 (FIG. 4H) of a different content item.

The GUIs shown in FIGS. 4A-4R are described in greater detail below in conjunction with the methods 500 and 550 of FIGS. 5A-5D.

FIGS. 5A-5D are flow diagrams illustrating methods 500 (FIGS. 5A-5C) and 550 (FIG. 5D) of viewing content items, in accordance with some embodiments. The methods 500 and 550 are performed on an electronic device (e.g., client device 104, FIGS. 1 and 3). FIGS. 5A-5D correspond to instructions stored in a computer memory (e.g., memory 306 of the client device 104, FIG. 3) or other computer-readable storage medium. To assist with describing the methods 500 and 500, FIGS. 5A-5D will be described with reference to the exemplary GUIs illustrated in FIGS. 4A-4R.

In performing the method 500, an electronic device (e.g., a social network module 340 of client device 104, FIG. 3) displays (502) a cover page of a first content item. Content items include various types of electronic content, such as text (e.g., articles, web pages, blogs, user content published via a social-networking service), digital photos, videos, audio files, links, and/or other electronic content. Content items may be provided by and/or accessible through a web site (e.g., a news website), a social-networking service (e.g., provided by a social network system 108, FIGS. 1 and 2), and/or a third-party server (e.g., third party servers 110, FIG. 1). In some embodiments, content items include web content, where web content is formatted content accessible and viewable by a browser (e.g., a web browser module 338, a social network module 340, FIG. 3). As an example, web content may be HTML-formatted content viewable by a web browser (e.g., web browser module 338, FIG. 3). In contrast, in some embodiments, native content is formatted content that is only accessible and viewable by a limited set of applications (e.g., viewable by social network module 340, but not a web browser module 338). In some embodiments, web content is formatted content that is accessible (i.e., downloaded) from a first source (e.g., a source webpage hosted by a third party server 110-1, FIG. 1), and native content is formatted content that is accessible from a second source distinct from the first source (e.g., social network system 108, FIG. 1).

A cover page of a content item is a GUI associated with the content item. The cover page may serve as a preview of the corresponding content item. FIG. 4A illustrates an example in which a client device 104-1 displays a cover page 400-1 of a content item. In some embodiments, the cover page includes (504) a title (e.g., "Doe Awarded Nobel Peace Prize," 406, FIG. 4A), a byline (e.g., "By John Hancock," 408), a picture (e.g., 402), and/or a publication source (e.g., "Source 01," 404). In some embodiments, the cover page includes text, a media file (e.g., photo, video, audio recording), and/or other electronic content that is associated with the first content item (i.e., a picture representative of, or related to, the first content item). In some embodiments, the cover page includes at least a portion of the first content item (e.g., a title, byline, picture, publication source, and/or a portion of a body of content), while in other embodiments, the cover page and the first content item include distinct content (e.g., the cover page includes a picture that is not included in the first content item). In some embodiments, cover pages of content items include native content (e.g., accessible and viewable by a social network module 340, FIG. 3).

The electronic device detects (506) a swipe gesture in a first direction. An example of a swipe gesture 410-7 is shown in FIG. 4P. In some embodiments, the swipe gesture is (508) a substantially vertical swipe (e.g., within a specified number of degrees of vertical), as shown for the swipe gesture 410-7. Alternatively, the swipe gesture may be a substantially horizontal swipe. In some embodiments, the swipe gesture is a touch-screen input (e.g., detected by the touch-sensitive surface 314 of client device 104, FIG. 3). The swipe gesture may also be detected by other input devices (e.g., a touchpad).

In response to detecting (506) the swipe gesture in the first direction, the electronic device transitions (510) from display of the cover page of the first content item to display of the first content item (e.g., transitioning shown in FIGS. 4P and 4Q). During the transition (510), a first portion of the cover page of the first content item and a first portion of the first content item are simultaneously displayed. For example, in response to detecting the swipe gesture 410-7 (FIG. 4P), the client device 104-1 displays a portion 400-3 of the cover page and a portion 420-5 of the first content item (FIG. 4Q).

In some embodiments, transitioning (510) from display of the cover page of the first content item to display of the first content item includes decreasing (512) an amount of the cover page of the first content item being displayed, until the cover page of the first content item is no longer displayed. While decreasing (512) the amount of the cover page being displayed, an amount of the first content item being displayed is increased (514) until the cover page of the first content item is no longer displayed. In some embodiments, decreasing (512) the amount of the cover page of the first content item being displayed and increasing (514) the amount of the first content item being displayed is in proportion to a magnitude (e.g., duration of time with which contact is made with the surface of the electronic device, total physical distance traversed, etc.) of the first swipe gesture in the first direction.

In some embodiments, displaying the cover page of the first content item is performed within a first application (e.g., social network module 340, FIG. 3), the transitioning is performed within the first application, and displaying the first content item is performed within the first application. Thus, rather than loading the first content item (e.g., web content) by executing an application distinct from the application for viewing native content (e.g., executing a web browser module 338 distinct from the social network module 340), both the first content item and the cover page are viewed within the application for viewing native content (e.g., social network module 340).

In some embodiments, transitioning (510) from display of the cover page of the first content item to display of the first content item includes (516) scrolling (e.g., continuously), within a window, from display of the cover page of the first content item to display of the first content item. Thus, transitioning does not include switching to and displaying the first content item (e.g., web content) in a separate window of the application for viewing native content (e.g., in an integrated web browser of the social network module 340), or in a separate window of a distinct application (e.g., browser module 338, FIG. 3). An example is shown in FIGS. 4P through 4R, where transitioning from the cover page 400-1 to the content item 420-1 is performed within a single window of the application (e.g., social network module 340).

Alternatively, in some embodiments, in response to detecting the swipe gesture in the first direction, the electronic device ceases display of the cover page of the first content item. In some embodiments, the electronic device displays an intermediate view before displaying the first content item. For example, in response to detecting the swipe gesture 410-1 (FIG. 4A), the client device 104-1 ceases display of the cover page 400-1 and displays an intermediate view (e.g., 411-1 and 411-2, FIGS. 4B and 4C) before displaying the content item (FIG. 4D).

In some embodiments, displaying the intermediate view includes displaying a blank screen (e.g., 411-2, FIG. 4C). Displaying an intermediate view may also include displaying an advertisement (e.g., image, video, and/or audio), an image, or interactive content (e.g., interactive video game). Optionally, a progress bar 412 (FIGS. 4B and 4C) is displayed that corresponds to the progress of downloading the content item.

In some embodiments, displaying the intermediate view includes decreasing an amount of the cover page of the first content item being displayed, until the cover page of the first content item is no longer displayed. While decreasing the amount of the cover page being displayed, an amount of the intermediate view being displayed is increased until the cover page of the first content item is no longer displayed. An example is illustrated in FIGS. 4B and 4C, where in response to detecting the swipe gesture 410-1 (FIG. 4A), an amount of the cover page 400-2 being displayed is decreased while an amount of the intermediate view 411-1 is increased (FIG. 4B), until the cover page is no longer displayed and the entirety of the intermediate view 411-2 is displayed (FIG. 4C).

In some embodiments, the first content item is (518) downloaded (e.g., from a webpage that is the source of the first content item) in response to detecting (506) the swipe gesture (e.g., 410-7, FIG. 4P). Thus, in some embodiments, the electronic device displays the cover page of the content item without first downloading the content item. In other embodiments, the first content item or a portion thereof is downloaded (e.g., from a source webpage) in response to displaying the cover page of the content item. In some embodiments, the intermediate view is displayed until the first content item is fully downloaded. Alternatively, in some embodiments, the intermediate view is displayed until a threshold portion of the first content item is downloaded (e.g., a blank page is displayed until the initially displayed portion 420-1 of the content item (as shown in FIG. 4D) is downloaded). In the example of FIG. 5A, no intermediate view is displayed.

Figure 5B:
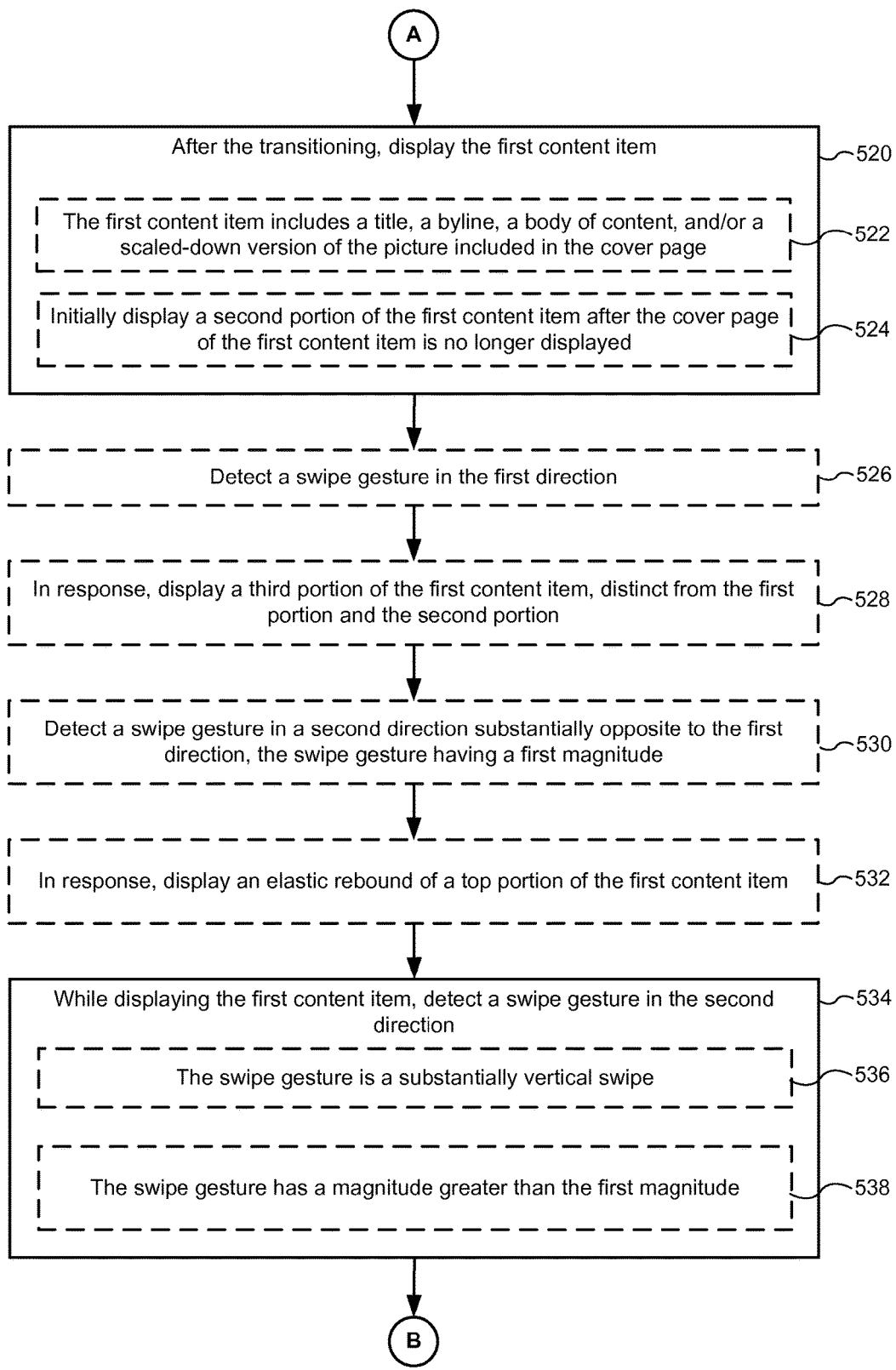

Referring now to FIG. 5B, after the transitioning (510), the first content item is displayed (520). FIG. 4R illustrates an example of an initially displayed portion 420-1 of a first content item. The first content item corresponds to the cover page 400-1 shown in FIG. 4P. In some embodiments, the first content item includes (522) a title (e.g., "Doe Awarded Nobel Peace Prize," 426, FIG. 4A), a byline (e.g., "By John Hancock," 428), a body of content (e.g., 430), the picture (e.g., a scaled-down version of the picture) included in the cover page (e.g., 422), and/or a publication source (e.g., "Source 01," 424). Displaying (520) the first content item may include displaying the content item in a full-HTML format, a mobile-device format (e.g., HTML5), or any other suitable markup language.

In some embodiments, displaying (520) the first content item includes initially displaying (524) a second portion of the first content item after the cover page of the first content item is no longer displayed. Just as the transitioning is performed in a single application in accordance with some embodiments, the first content item is displayed in the same application that displays the cover page. For example, FIG. 4R shows a portion 420-1 of the first content item, while FIG. 4Q shows a different (but partially overlapping) portion 420-5 of the content item. Both of these are portions of the same content item.

In some embodiments, a swipe gesture is detected (526) in the first direction (after and in addition to the swipe gesture detected in step 506). In response to detecting (526) this swipe gesture, a third portion of the first content item, distinct from the first portion and second portion, is displayed (528). FIG. 4E illustrates an example of the swipe gesture 410-2, which is detected as the client device 104-1 displays the second portion 420-1 of the content item. As shown in FIG. 4F, in response to detecting the swipe gesture 410-2, a third portion 420-2 of the content item (distinct from the second portion 420-1, FIG. 4E) is displayed. For example, the display scrolls from the second portion 420-1 to the third portion 420-2. In some embodiments, the second portion 420-1 of the first content item and the third portion 420-2 of the first content item partially overlap (e.g., the body of content included in the second portion 420-1 (FIG. 4E) includes a portion of the body of content included in the third portion 420-2 (FIG. 4F)).

In some embodiments, while displaying (520) the first content item, a swipe gesture is detected (530) in a second direction substantially opposite to the first direction. The swipe gesture has a first magnitude. The magnitude of a swipe gesture may correspond to the duration of time with which contact is made with the surface of the electronic device (e.g., touch-sensitive surface 314, FIG. 3) and/or the total physical distance traversed by the swipe gesture. In response to detecting (530) the swipe gesture, an elastic rebound of a top portion of the first content item is displayed (532). In some embodiments, the elastic rebound is displayed if the first magnitude of the swipe gesture does not satisfy a threshold magnitude (e.g., the swipe is too short). An example is shown in FIGS. 4K and 4L. In this example, in response to detecting the swipe gesture 410-5 (FIG. 4K), a rebound (e.g., a bounce animation) of a top portion 420-4 of the content item is displayed (FIG. 4L). That is, in this example, after displaying the top portion 420-4 of the content item, the electronic device returns to displaying the initially displayed portion 420-1 of the content item shown in FIG. 4K.

While displaying (520) the first content item, the electronic device detects (534) a swipe gesture in the second direction (e.g., the second direction in optional step 532), where the second direction is substantially opposite to the first direction. In some embodiments, this swipe is (536) a substantially vertical swipe (e.g., swipe gesture 410-6, FIG. 4M). In some embodiments, the swipe gesture has (538) a magnitude greater than the first magnitude (e.g., the swipe gesture 410-6 in FIG. 4M has a greater magnitude than the swipe gesture 410-5 in FIG. 4K). For example, the swipe gesture's magnitude satisfies (e.g., exceeds, or equals or exceeds) a threshold magnitude.

Figure 5C:
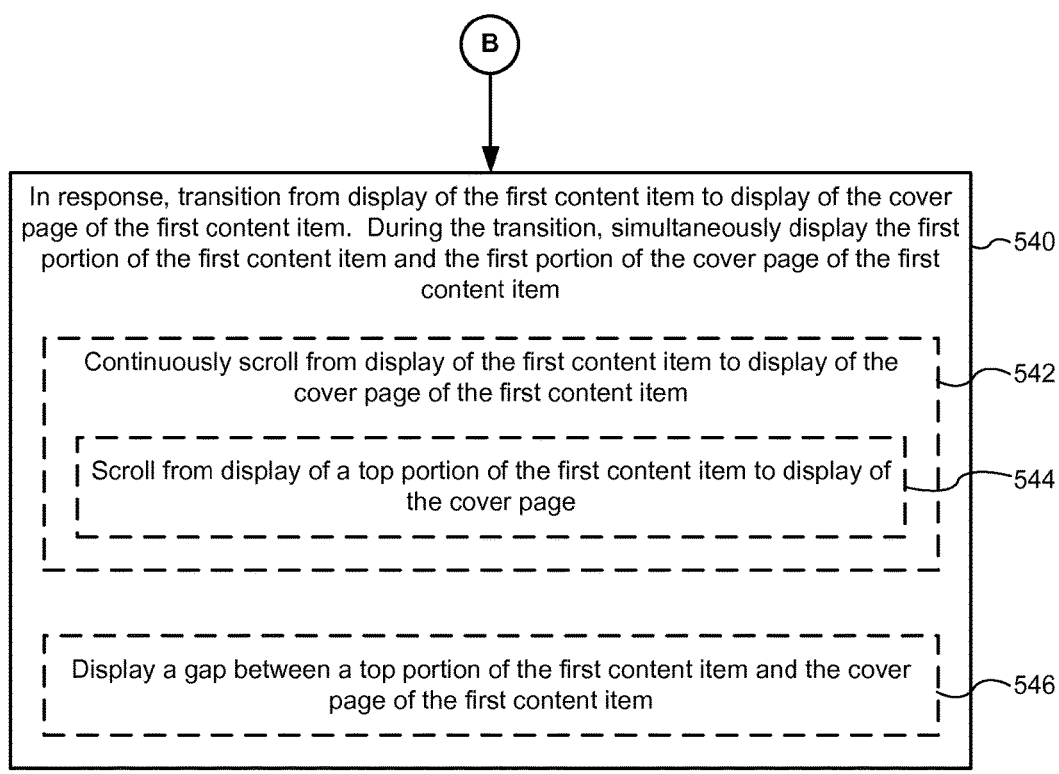
Figure 5D:
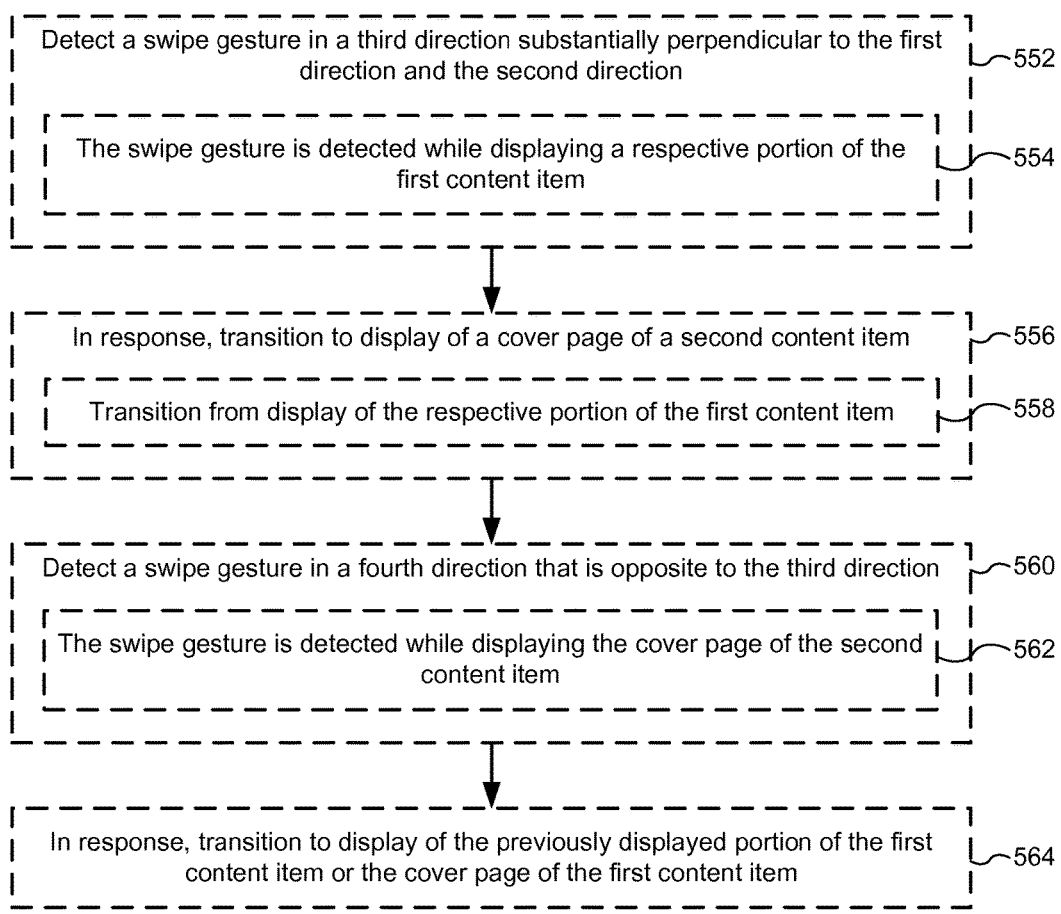

Referring now to FIG. 5C, in response to detecting (534) the swipe gesture in the second direction, the electronic device transitions (540) from display of the first content item to display of the cover page of the first content item (e.g., to display of the cover page 400-1, FIG. 4O). During the transition (540), the first portion of the first content item and the first portion of the cover page of the first content item are simultaneously displayed. FIG. 4N illustrates an example in which a portion 400-3 of the cover page is displayed simultaneously with a portion 420-5 of the first content item. In some embodiments, transitioning (540) includes continuously scrolling (542) from display of the first content item to display of the cover page of the first content item. When continuously scrolling, there is no ceasing display (e.g., no blank page) of either the portion of the first content item or the cover page (e.g., no blank page is displayed between display of the portion of the first content item and display of the cover page). In some embodiments, continuously scrolling (542) includes scrolling (544) from display of a top portion of the first content item to display of the cover page. In some embodiments, the cover page and content item merge, such that no gap is displayed between them. In some embodiments, a gap is displayed (546) between a top portion of the first content item and the cover page of the first content item. In some embodiments, transitioning (540) occurs if the magnitude of the detected swipe gesture (operation 534, FIG. 5B) satisfies a threshold magnitude (e.g., the swipe is sufficiently long).

In some embodiments, the swipe gestures in operations 526, 530, and 534 may be detected while the electronic device is displaying an initially displayed portion of the content item (e.g., the portion 420-1 of the content item shown in FIG. 4K), or alternatively, while the electronic device is displaying another portion of the content item distinct from the initially displayed portion (e.g., the portion 420-2 of the content item, FIG. 4F).

Referring now to FIG. 5D, in performing the method 550, the electronic device detects (552) a swipe gesture in a third direction substantially perpendicular to the first direction and the second direction. For example, as shown in FIG. 4F, the swipe gesture 410-3 is a substantially horizontal swipe (e.g., within a specified number of degrees of horizontal), which is substantially perpendicular to the first direction (e.g., of swipe gesture 410-1, FIG. 4A) and the second direction (e.g., of swipe gesture 410-5, FIG. 4K). In some embodiments, the swipe gesture is detected (552) while displaying (554) a respective portion of the first content item (e.g., in FIG. 4F, the swipe gesture 410-3 is detected while displaying the portion 420-2 of the first content item).

In some embodiments, in response to detecting (552) the swipe gesture in the third direction, the electronic device transitions (556) to display of a cover page of a second content item. In some embodiments, transitioning (556) includes transitioning (558) from display of the respective portion of the first content item (e.g., the portion 420-2 of the first content item, FIG. 4F). As an example, in response to detecting the swipe gesture 410-3 (FIG. 4F), the electronic device transitions (e.g., scrolls) from displaying the portion 420-2 of the first content item (FIG. 4F) to displaying the cover page 440-2 of the second content item (FIG. 4H). Optionally, as shown in FIG. 4G, during the transition (556), the electronic device simultaneously displays a portion of the first content item (e.g., portion 420-2) and a portion of the cover page of the second content item (e.g., portion 440-1). Alternatively, display of a portion of the first content item ceases, and the cover page of the second content item is then displayed (i.e., without simultaneously displaying the portion 420-3 of the first content item and the portion 440-1 of the cover page of the second content item, as shown in FIG. 4G).

In some embodiments, the electronic device detects (560) a swipe gesture in a fourth direction that is opposite to the third direction. For example, as shown in FIG. 4H, the swipe gesture 410-4 is a substantially horizontal swipe in a direction that is opposite to the third direction (e.g., of swipe gesture 410-3, FIG. 4F). In some embodiments, the swipe gesture is detected (560) while displaying (562) the cover page of the second content item (e.g., in FIG. 4H, the swipe gesture 410-4 is detected while displaying the cover page 440-2 of the second content item). Alternatively, the swipe gesture is detected while displaying the second content item or a portion thereof. For example, the user may have navigated from the cover page of the second content item into the second content item itself before making the swipe gesture in the fourth direction.

In some embodiments, in response to detecting (560) the swipe gesture in the fourth direction, the electronic device transitions (564) to display of the previously displayed (i.e., most recently displayed, and thus last-displayed) portion of the first content item or the cover page of the first content item. As an example, in response to detecting the swipe gesture 410-4 (FIG. 4H), the electronic device transitions from displaying the cover page 440-2 of the second content item (FIG. 4H) to displaying the previously displayed portion 420-2 of the first content item (FIG. 4H) (i.e., the portion of the first content item that was last displayed before displaying the cover page of the second content item). This provides a placeholder for a previously viewed content item, so that swiping back will return a user to the last section of the previously viewed content item. Optionally, during the transition (564), the electronic device simultaneously displays a portion of the first content item (e.g., portion 420-3, FIG. 4I) and a portion of the cover page of the second content item (e.g., portion 440-1, FIG. 4I), while in other embodiments, the portions are not simultaneously displayed.

Although the method 550 is described with respect to detecting the swipe gesture 410-3 while displaying the portion 420-2 of the first content item (FIG. 4F), and detecting the swipe gesture 410-1 while displaying the cover page 440-2 of the second content item (FIG. 4H), any steps of the method 550 may be performed in conjunction with, and at any stage of performing, the steps of the method 500. That is, any of the swipe gestures of the method 550 may be detected while displaying a cover page (e.g., cover page 400-1, FIG. 4A), or any other portion of, a content item. Similarly, in response to detecting the swipe gestures, the electronic device may also transition from displaying a cover page, or any other portion of, a content item.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    at an electronic device having one or more processors and memory storing instructions for execution by the one or more processors:
        downloading, from a first source, a cover page of an article;
        displaying, in a social-network interface, the cover page of the article, wherein the article is downloadable from a second source distinct from the first source;
        detecting a first swipe gesture in a first direction;
        in response to detecting the first swipe gesture, transitioning from display of the cover page of the article to display of the article in the social-network interface, comprising:
            decreasing, according to a total distance traversed by the first swipe gesture, an amount of the cover page displayed while proportionally increasing an amount of an intermediate view displayed; and
            after a threshold portion, less than all, of the article is downloaded from the second source, ceasing display of the intermediate view and displaying at least a first portion of the article;
        while displaying the article, detecting a second swipe gesture in a second direction substantially opposite to the first direction; and
        in response to detecting the second swipe gesture and in accordance with a determination that a total distance traversed by the second swipe gesture satisfies a distance threshold, transitioning from display of the article to display of the cover page of the article in the social-network interface, comprising simultaneously displaying the first portion of the article and a first portion of the cover page.

2. The method of claim 1, further comprising:
    detecting a third swipe gesture in a third direction substantially perpendicular to the first direction and the second direction; and
    in response to detecting the third swipe gesture, transitioning to display of a cover page of a different article in the social-network interface.

3. The method of claim 2, wherein:
    the third swipe gesture is detected while displaying a respective portion of the article in the social-network interface; and
    transitioning to display of the cover page of the different article comprises transitioning from display of the respective portion of the article.

4. The method of claim 3, further comprising:
    after transitioning from display of the respective portion of the article to display of the cover page of the different article:
        detecting a fourth swipe gesture in a fourth direction that is opposite to the third direction; and
        in response to detecting the fourth swipe gesture, transitioning to display of the respective portion of the article in the social-network interface.

5. The method of claim 4, wherein the fourth swipe gesture is detected while displaying the cover page of the different article.

6. The method of claim 1, wherein:
    the cover page of the article comprises a title and a byline; and
    the article comprises the title, the byline, and a body of content.

7. The method of claim 6, wherein:
    the cover page of the article further comprises a picture; and
    the article further comprises a scaled-down version of the picture.

8. The method of claim 1, wherein:
displaying the cover page of the article is performed within a first application that provides the social-network interface;
transitioning from display of the cover page of the article to display of the article and transitioning from display of the article to display of the cover page of the article are performed within the first application; and
displaying the article is performed within the first application.

9. The method of claim 1, wherein displaying the article comprises initially displaying a second portion of the article after the cover page is no longer displayed.

10. The method of claim 9, further comprising:
detecting a third swipe gesture in the first direction; and
in response to detecting the third swipe gesture, displaying a third portion of the article, distinct from the first portion and second portion.

11. The method of claim 1, further comprising:
detecting a third swipe gesture that occurs before the second swipe gesture, the third swipe gesture being in the second direction and having a magnitude less than a magnitude of the second swipe gesture; and
in response to detecting the third swipe gesture and in accordance with a determination that a total distance traversed by the third swipe gesture does not satisfy the distance threshold, displaying an elastic rebound of a top portion of the article.

12. The method of claim 1, wherein:
the first swipe gesture is a substantially vertical swipe in the first direction; and
the second swipe gesture is a substantially vertical swipe in the second direction.

13. An electronic device, comprising:
one or more processors; and
memory storing one or more programs for execution by the one or more processors, the one or more programs including instructions for:
  downloading, from a first source, a cover page of an article;
  displaying, in a social-network interface, the cover page of the article, wherein the article is downloadable from a second source distinct from the first source;
  detecting a first swipe gesture in a first direction;
  in response to detecting the first swipe gesture, transitioning from display of the cover page of the article to display of the article in the social-network interface, comprising:
    decreasing, according to a total distance traversed by the first swipe gesture, an amount of the cover page displayed while proportionally increasing an amount of an intermediate view displayed; and
    after a threshold portion, less than all, of the article is downloaded from the second source, ceasing display of the intermediate view and displaying at least a first portion of the article;
  while displaying the article, detecting a second swipe gesture in a second direction substantially opposite to the first direction; and
  in response to detecting the second swipe gesture and in accordance with a determination that a total distance traversed by the second swipe gesture satisfies a distance threshold, transitioning from display of the article to display of the cover page of the article in the social-network interface, comprising simultaneously displaying the first portion of the article and a first portion of the cover page.

14. A non-transitory computer-readable storage medium storing one or more programs for execution by one or more processors of an electronic device, the one or more programs including instructions for:
  downloading, from a first source, a cover page of an article;
  displaying, in a social-network interface, the cover page of the article, wherein the article is downloadable from a second source distinct from the first source;
  detecting a first swipe gesture in a first direction;
  in response to detecting the first swipe gesture, transitioning from display of the cover page of the article to display of the article in the social-network interface, comprising:
    decreasing, according to a total distance traversed by the first swipe gesture, an amount of the cover page displayed while proportionally increasing an amount of an intermediate view displayed; and
    after a threshold portion, less than all, of the article is downloaded from the second source, ceasing display of the intermediate view and displaying at least a first portion of the article;
  while displaying the article, detecting a second swipe gesture in a second direction substantially opposite to the first direction; and
  in response to detecting the second swipe gesture and in accordance with a determination that a total distance traversed by the second swipe gesture satisfies a distance threshold, transitioning from display of the article to display of the cover page of the article in the social-network interface, comprising simultaneously displaying the first portion of the article and a first portion of the cover page.

15. The method of claim 1, wherein:
the first source is a social-network system; and
the second source is a third-party server that is distinct from the social-network system.

16. The method of claim 1, wherein displaying the intermediate view comprises displaying a blank window.

17. The method of claim 16, wherein displaying the intermediate view further includes displaying a progress bar that corresponds to the downloading of the article.

18. The method of claim 1, wherein displaying the intermediate view comprises displaying interactive content.

19. The method of claim 18, wherein displaying the intermediate view further includes displaying a progress bar that corresponds to the downloading of the article.

* * * * *